US009698893B1

(12) United States Patent
Tobin

(10) Patent No.: US 9,698,893 B1
(45) Date of Patent: Jul. 4, 2017

(54) CELLULAR NETWORK COVERAGE USING A SET OF MOBILE DEVICES

(71) Applicant: Verizon Patent and Licensing Inc., Arlington, VA (US)

(72) Inventor: Brian J. Tobin, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/976,957

(22) Filed: Dec. 21, 2015

(51) Int. Cl.
*H04B 3/36* (2006.01)
*H04B 7/155* (2006.01)
*H04W 40/22* (2009.01)

(52) U.S. Cl.
CPC ........ *H04B 7/15507* (2013.01); *H04W 40/22* (2013.01)

(58) Field of Classification Search
CPC ... H04B 7/2606; H04W 76/023; H04W 88/04
USPC ............................................................ 455/7
See application file for complete search history.

(56) References Cited

U.S. PATENT DOCUMENTS

| | | | | |
|---|---|---|---|---|
| 2009/0176492 A1* | 7/2009 | Kwon | ................... | H04B 7/026 455/436 |
| 2010/0022184 A1* | 1/2010 | Khoshnevis | ......... | H04B 7/2606 455/7 |
| 2012/0315841 A1* | 12/2012 | Zhou | ................... | H04B 7/2606 455/11.1 |
| 2013/0034048 A1* | 2/2013 | Adachi | .............. | H04B 7/15592 370/315 |
| 2014/0349663 A1* | 11/2014 | Shu | ................... | H04W 52/0216 455/450 |
| 2016/0165575 A1* | 6/2016 | Park | ................. | H04W 72/1268 370/329 |
| 2016/0269486 A1* | 9/2016 | Gupta | .................... | H04L 67/12 |

OTHER PUBLICATIONS

Wikipedia, "SpiderCloud Wireless", https://en.wikipedia.org/wiki/SpiderCloud_Wireless, Oct. 28, 2015, 2 pages.
SpiderCloud Wireless, "SpiderCloud Wireless", http://www.spidercloud.com/, Feb. 27, 2015, 12 pages.
Wikipedia, "Wireless repeater", https://en.wikipedia.org/wiki/Wireless_repeater, Oct. 15, 2015, 3 pages.

* cited by examiner

*Primary Examiner* — Wesley Kim
*Assistant Examiner* — Raj Chakraborty

(57) ABSTRACT

A method may include transmitting an amplification request relating to cellular signals transmitted by or received by the device. The method may include receiving, based on transmitting the amplification request, a set of amplification responses corresponding to a respective set of mobile devices. A mobile device, of the set of mobile devices, may transmit an amplification response, of the set of amplification responses, based on the mobile device being available to amplify the cellular signals. The method may include selecting at least two mobile devices, of the set of mobile devices, to amplify the cellular signals transmitted or received by the device. The at least two mobile devices may be selected based on information included in respective amplification responses, of the set of amplification responses, corresponding to the at least two mobile devices. The method may include causing the at least two mobile devices to amplify the cellular signals.

20 Claims, 6 Drawing Sheets

CELLULAR NETWORK COVERAGE USING A SET OF MOBILE DEVICES

BACKGROUND

A mobile device may transmit information to and/or receive information from a cellular network using cellular signals. Different mobile devices may be associated with different levels of cellular reception. For example, a mobile device that is underground, within a building, or otherwise impeded from establishing a reliable connection with a base station of the cellular network, may have inferior cellular reception as compared to a mobile device that is aboveground, in an unenclosed area, located near a base station, or the like.

DETAILED DESCRIPTION OF PREFERRED EMBODIMENTS

Figure 1A:
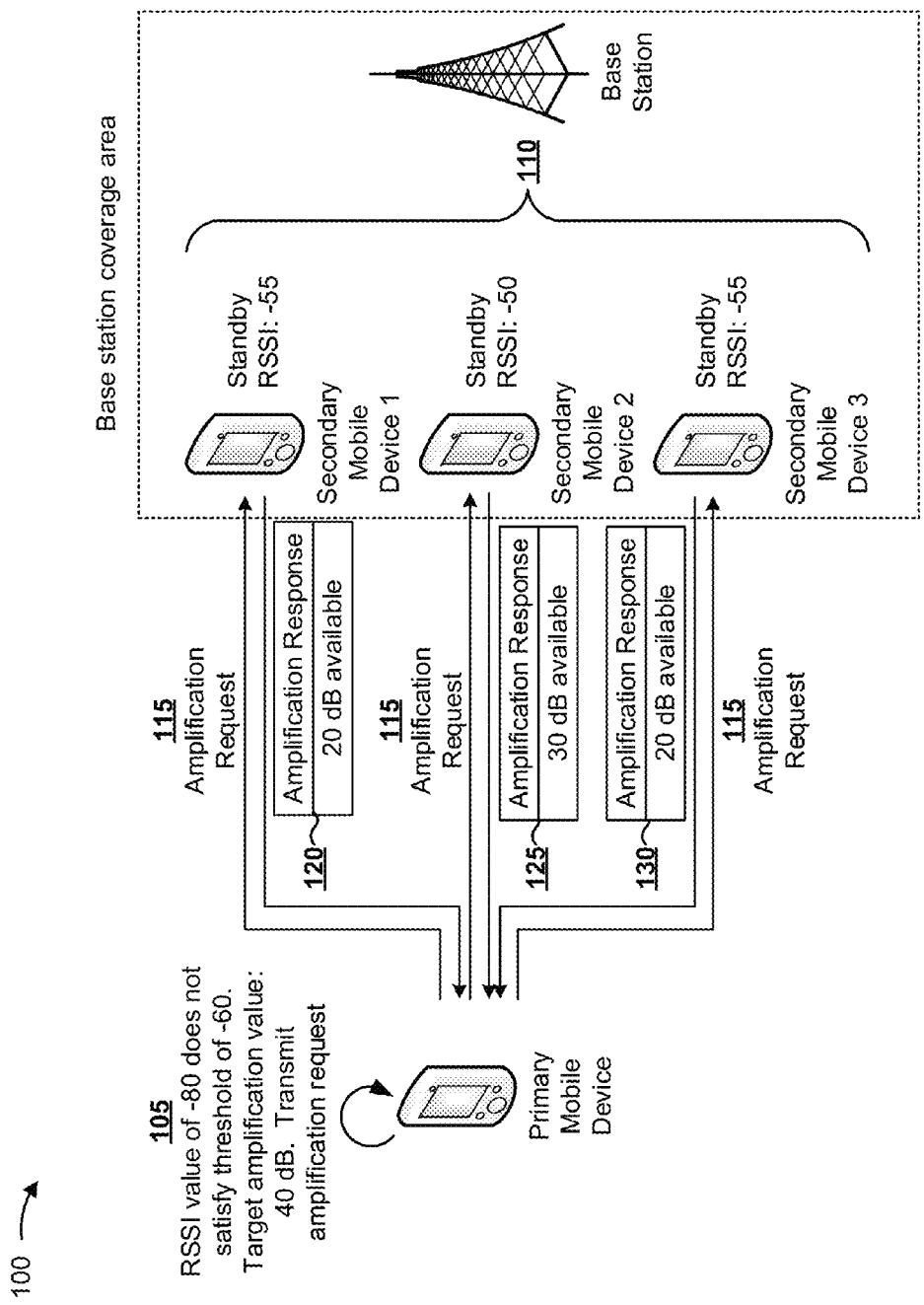
FIGS. 1A-1C are diagrams of an overview of an example implementation described herein.

The following detailed description of example implementations refers to the accompanying drawings. The same reference numbers in different drawings may identify the same or similar elements.

A mobile device may transmit data to and/or receive data from a base station of a cellular network using cellular signals. In some cases, a first mobile device (e.g., referred to herein as a primary mobile device) may be associated with poorer cellular reception, and therefore a lower cellular signal strength value (e.g., a received signal strength indicator value, a channel quality indicator value, a signal to interference plus noise ratio, and/or another measurement of cellular signal strength and/or quality) than a second mobile device (e.g., referred to herein as a secondary mobile device). For example, the secondary mobile device may be closer to the base station than the primary mobile device, may be associated with less signal interference than the primary mobile device, may be located closer to a window or door of an enclosure than the primary mobile device, or the like.

In such cases, the secondary mobile device may amplify cellular signals associated with the primary mobile device to improve cellular reception for the primary mobile device. For example, the secondary mobile device may receive cellular signals (e.g., en route to and/or from the primary mobile device), may amplify the cellular signals, and may transmit amplified cellular signals (e.g., to the primary mobile device and/or the base station). As used herein, "amplification" may refer to adding energy to a received cellular signal and outputting the cellular signal at a higher power level. Additionally, or alternatively, "amplification" may refer to receiving a cellular signal, processing the cellular signal, and outputting a cellular signal that is generated based on the received cellular signal and at a higher power level than a power level associated with the received cellular signal.

However, performance of the secondary mobile device may be impacted by amplification of the cellular signals. For example, the secondary mobile device may be capable of transmitting cellular signals at a particular power using an antenna included in the secondary mobile device. The secondary mobile device may use a portion of or all of the particular power when transmitting the amplified cellular signals, which may decrease signal strength for cellular signal transmissions other than the amplified cellular signals, and which may increase battery usage of the secondary mobile device.

Further, in some cases, data en route to and/or from the primary mobile device may be processed by a main processor and/or a primary cellular antenna of the secondary mobile device, which may impact processor performance and battery performance of the secondary mobile device, and which may create privacy concerns for a user associated with the primary mobile device. For example, when using a main processor and/or a primary cellular antenna of the secondary mobile device, a malicious party may more easily intercept cellular signals associated with the primary mobile device during the amplification process than when using an additional antenna and/or a processor other than a main processor of the secondary mobile device. Still further, in a situation where the secondary mobile device fails to amplify the cellular signals, the primary mobile device and/or the base station may not receive amplified cellular signals.

Implementations described herein enable the primary mobile device to cause a set of secondary mobile devices to amplify cellular signals associated with the primary mobile device. The primary mobile device may transmit an amplification request and may receive amplification responses from the set of secondary mobile devices based on the set of secondary mobile devices being available to amplify cellular signals. Based on the amplification responses, the primary mobile device may select two or more of the set of secondary mobile devices to amplify cellular signals and, in some cases, may cause the two or more secondary mobile devices to provide different amplification values (e.g., based on power headroom values identified by the amplification responses, based on amplification values identified by the amplification responses that the set of secondary mobile devices can provide, based on cellular signal strength values identified by the amplification responses, etc.).

In this way, the primary mobile device reduces processor usage, antenna usage, and/or battery usage of each secondary mobile device, of the two or more secondary mobile devices, as compared to a situation where a single secondary mobile device amplifies the cellular signal. Further, the primary mobile device reduces an impact of a failure or unavailability of a single secondary mobile device of the set of secondary mobile devices. In some implementations, a secondary mobile device may amplify cellular signals without using a primary cellular antenna and/or a main processor of the secondary mobile device (e.g., using another antenna and/or processor that are separate from the primary cellular antenna or the main processor, etc.) which reduces processor and battery usage of the secondary mobile device and improves security of the amplification process by hampering a malicious party from obtaining cellular signal information from the primary cellular antenna and/or the main processor.

Figure 1B:
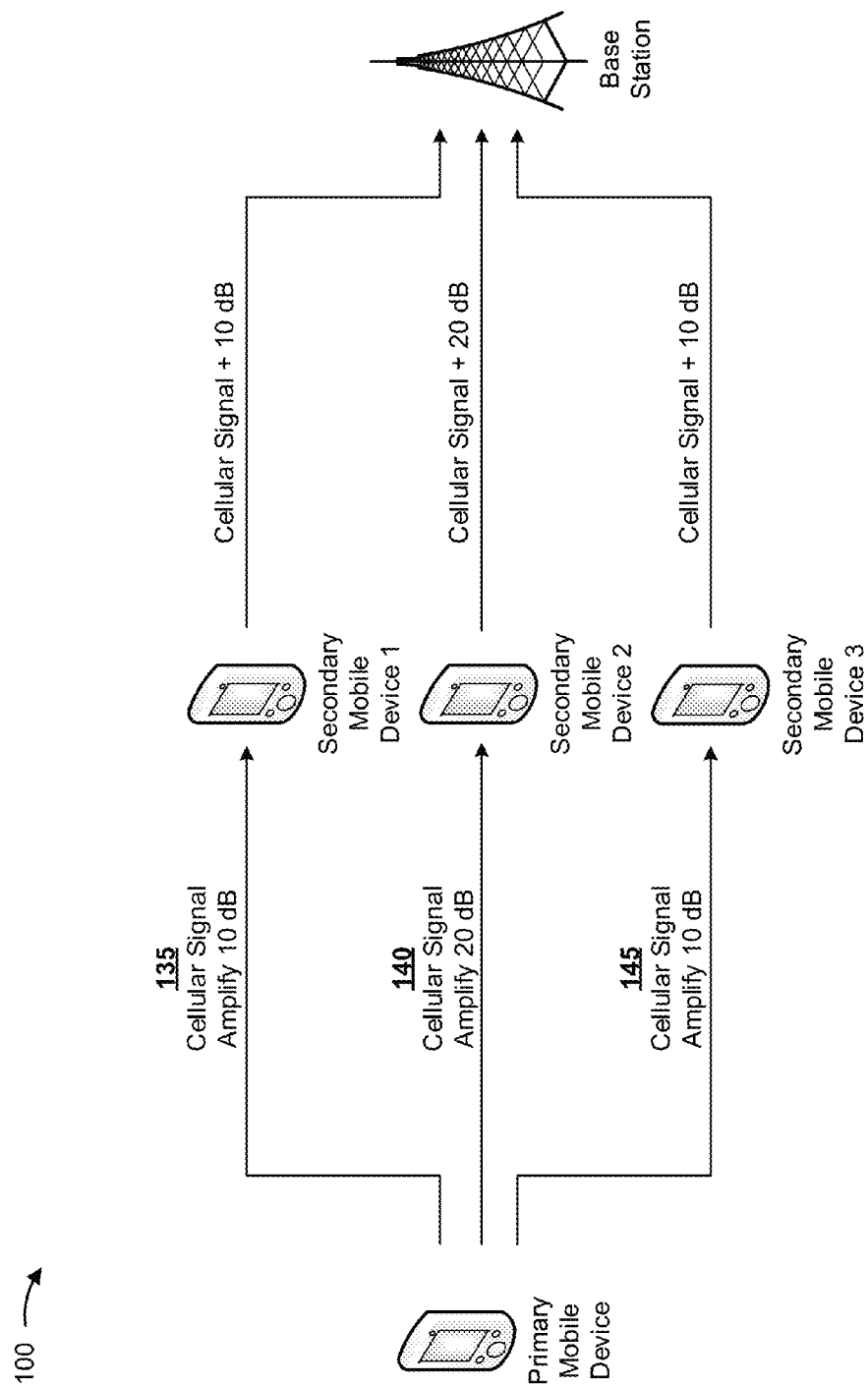
Figure 1C:
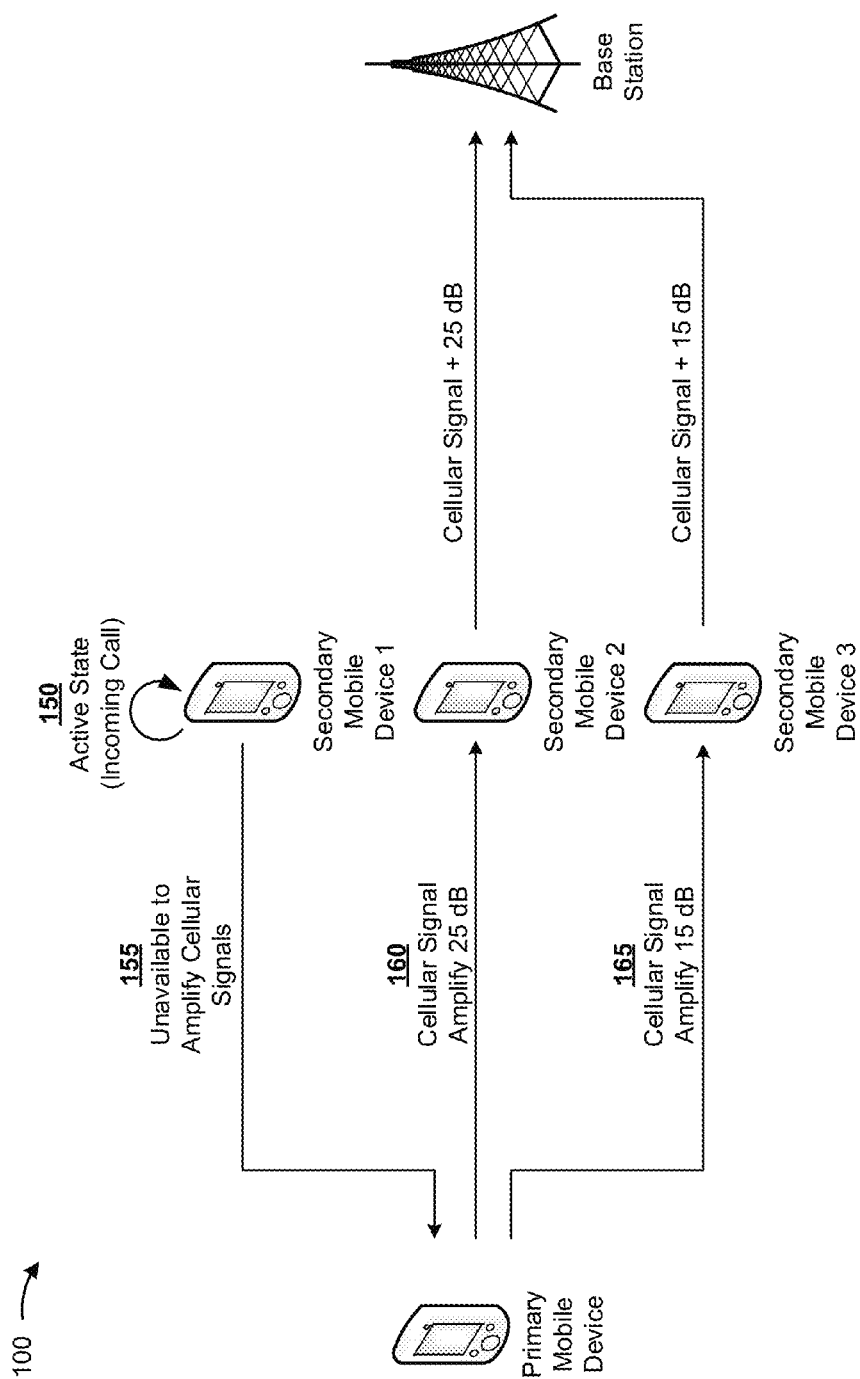

FIGS. 1A-1C are diagrams of an overview of an example implementation 100 described herein. As shown in FIG. 1A, and by reference number 105, a primary mobile device may determine that a cellular signal strength value associated with the primary mobile device (e.g., a received signal strength indicator (RSSI) value of −80, of a range of possible values between, for example, −50 and −100) does not satisfy a threshold (e.g., a threshold RSSI value of −60). In some implementations, the threshold may identify a threshold cellular signal strength value that is desired in order to provide a particular quality of service, to successfully place a call, to communicate with the cellular network using cellular signals at a particular power level, or the like.

As further shown, the primary mobile device may determine a target amplification value that, when provided by the set of secondary mobile devices, may cause the cellular signal strength value of the primary mobile device to satisfy the threshold. Here, the primary mobile device determines a target amplification value of 40 decibels (dB). The primary mobile device may determine the target amplification value based on a relationship between RSSI values and target amplification values, as described in more detail elsewhere herein.

As shown by reference number 110, each secondary mobile device, of a set of secondary mobile devices (e.g., Secondary Mobile Device 1, Secondary Mobile Device 2, and Secondary Mobile Device 3), is in a standby state. For example, each secondary mobile device may not be associated with an active call or data session, may not be in use by a user, or the like. As further shown, each secondary mobile device is associated with a higher cellular signal strength value than the primary mobile device. Here, Secondary Mobile Devices 1 and 3 are associated with RSSI values of −55, and Secondary Mobile Device 2 is associated with an RSSI value of −50.

As shown by reference number 115, based on the cellular signal strength value of the primary mobile device not satisfying the threshold, the primary mobile device may transmit an amplification request to the set of secondary mobile devices. For example, the primary mobile device may transmit the amplification request to each secondary mobile device that is within a particular distance of the primary mobile device, to each secondary mobile device that is within transmission range of the primary mobile device, or the like. In some implementations, the amplification request may identify the primary mobile device, may identify a channel, band, and/or frequency at which the primary mobile device communicates, may identify a communication protocol associated with the primary mobile device, or the like.

As shown by reference number 120, Secondary Mobile Device 1 may transmit an amplification response to the primary mobile device based on receiving the amplification request. The amplification response may indicate that Secondary Mobile Device 1 is available to amplify cellular signals associated with the primary mobile device. As shown, the amplification response may identify an amplification value that Secondary Mobile Device 1 is capable of providing for cellular signals associated with the primary mobile device (e.g., 20 dB).

As shown by reference number 125, Secondary Mobile Device 2 may transmit an amplification response that identifies an amplification value (e.g., 30 dB) that Secondary Mobile Device 2 is capable of providing. As shown by reference number 130, Secondary Mobile Device 3 may transmit an amplification response that identifies an amplification value (e.g., 20 dB) that Secondary Mobile Device 3 is capable of providing. The set of secondary mobile devices may determine the corresponding amplification values, for example, based on the cellular signal strength values associated with the set of secondary mobile devices, based on user preferences associated with the set of secondary mobile devices, or the like.

As shown in FIG. 1B, the primary mobile device may transmit cellular signals to the set of secondary mobile devices based on the amplification responses. For example, the primary mobile device may determine, based on information included in respective amplification responses, amplification values to be provided by each secondary mobile device of the set of secondary mobile devices. As shown by reference number 135, the primary mobile device provides an instruction to cause Secondary Mobile Device 1 to amplify cellular signals by 10 decibels, and provides the cellular signals to Secondary Mobile Device 1.

As shown by reference number 140, the primary mobile device provides an instruction to cause Secondary Mobile Device 2 to amplify the cellular signal by 20 decibels (e.g., based on the amplification value associated with Secondary Mobile Device 2 being greater than the amplification values associated with Secondary Mobile Device 1 and Secondary Mobile Device 3), and provides the cellular signals to Secondary Mobile Device 2.

As shown by reference number 145, the primary mobile device provides an instruction to cause Secondary Mobile Device 3 to amplify the cellular signal by 10 decibels, and provides the cellular signals to Secondary Mobile Device 3. As further shown, the set of secondary mobile devices outputs amplified cellular signals based on the instructions. In this way, cellular signals associated with the primary mobile device are amplified by the set of secondary mobile devices, which reduces processor usage, battery usage, and antenna usage of each of the set of secondary mobile devices relative to any individual secondary mobile device, of the set of secondary mobile devices, amplifying all of the cellular signals.

As shown in FIG. 1C, and by reference number 150, in some cases, a secondary mobile device may become unavailable to amplify cellular signals associated with the primary mobile device. Here, for example, Secondary Mobile Device 1 becomes unavailable based on changing from a standby state to an active state when receiving an incoming call. As shown by reference number 155, based on becoming unavailable to amplify cellular signals, Secondary Mobile Device 1 may transmit a message to the primary mobile device indicating that Secondary Mobile Device 1 is unavailable to amplify cellular signals.

As shown by reference number 160, based on the message, the primary mobile device may cause Secondary Mobile Device 2 to increase an amplification value associated with Secondary Mobile Device 2 from 20 dB to 25 dB. As shown by reference number 165, the primary mobile device may cause Secondary Mobile Device 3 to increase an amplification value associated with Secondary Mobile Device 3 from 10 dB to 15 dB. As shown, Secondary Mobile Devices 2 and 3 may amplify cellular signals associated with the primary mobile device by 25 dB and 15 dB, respectively.

In this way, a primary mobile device causes a set of secondary mobile devices to amplify cellular signals associated with the primary mobile device. By causing the set of secondary mobile devices to amplify the cellular signals, the primary mobile device reduces battery usage, processor usage, and antenna usage of each secondary mobile device, of the set of secondary mobile devices, as compared to a situation where a single secondary mobile device amplifies the cellular signals. Further, by causing the set of secondary mobile devices to amplify the cellular signals, the primary mobile device reduces an impact of a single secondary mobile device ceasing amplification of the cellular signals.

As indicated above, FIGS. 1A-1C are provided merely as an example. Other examples are possible and may differ from what was described with regard to FIGS. 1A-1C.

Figure 2:
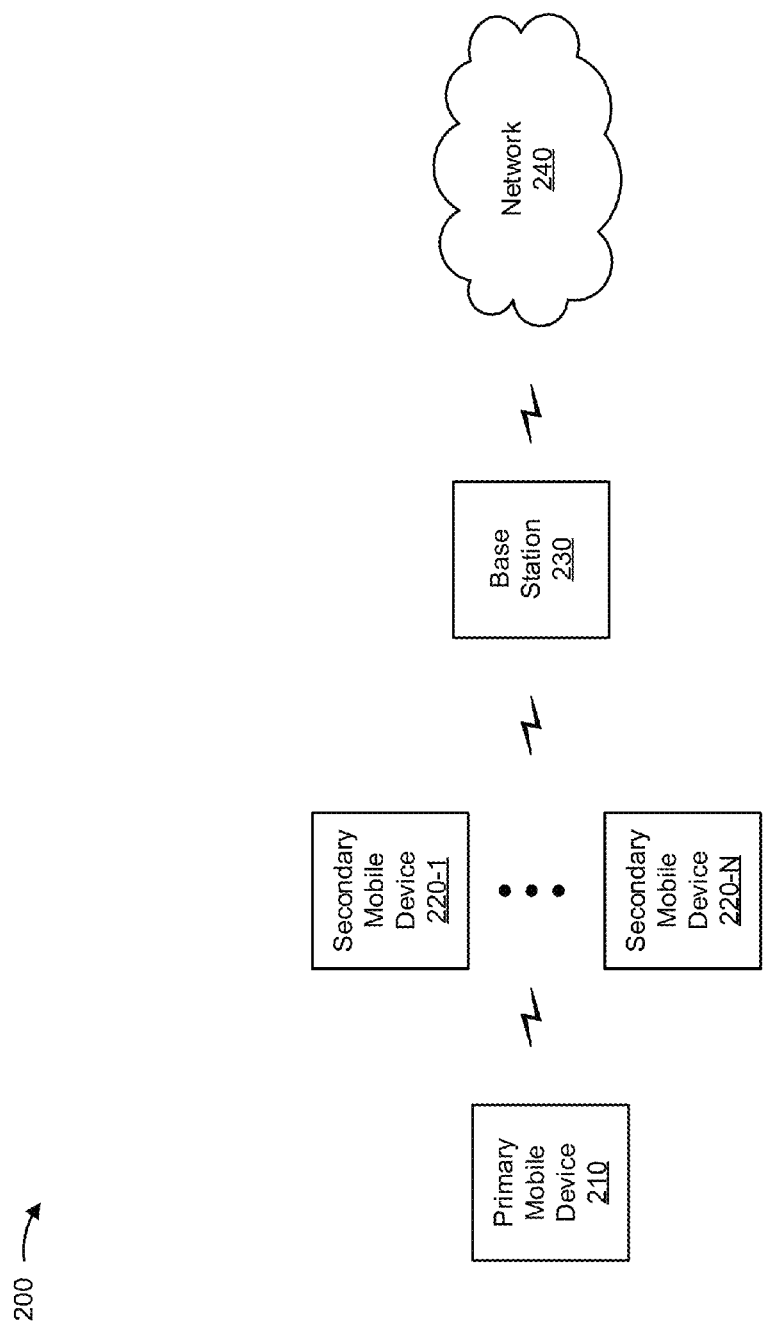
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a primary mobile device 210, two or more secondary mobile devices 220-1 through 220-N (hereinafter referred to collectively as "secondary mobile devices 220," and individually as "secondary mobile device 220"), a base station 230, and a network 240. Devices of environment 200 may interconnect via wired connections, wireless connections, or a combination of wired and wireless connections.

Primary mobile device 210 may include one or more devices capable of receiving, generating, storing, processing, and/or providing information. For example, primary mobile device 210 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, primary mobile device 210 may receive information from and/or transmit information to another device in environment 200.

Secondary mobile device 220 may include one or more devices capable of receiving, generating, storing, processing, and/or providing information. For example, secondary mobile device 220 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, secondary mobile device 220 may receive information from and/or transmit information to another device in environment 200.

Primary mobile device 210 and/or secondary mobile device 220 may include one or more antennas. For example, primary mobile device 210 and/or secondary mobile device 220 may include a primary cellular antenna (e.g., an antenna for transmitting and receiving cellular signals), a diversity cellular antenna (e.g., an antenna for receiving cellular signals), a WiFi antenna (e.g., an antenna for transmitting and receiving WiFi signals), a near-field communication (NFC) antenna (e.g., an antenna for transmitting and receiving NFC signals), or the like. In some implementations, primary mobile device 210 and/or secondary mobile device 220 may include an additional antenna other than the above antennas, and may amplify cellular signals using the additional antenna. In some implementations, the additional antenna may be associated with an additional processor other than a main processor of primary mobile device 210 and/or secondary mobile device 220, which may perform functions relating to amplification of cellular signals associated with primary mobile device 210.

Base station 230 may include one or more devices capable of transferring traffic, such as audio, video, text, and/or other traffic, destined for and/or received from primary mobile device 210 and/or secondary mobile device 220. Base station 230 may send traffic to and/or receive traffic from primary mobile device 210 and/or secondary mobile device 220 via an air interface. In some implementations, base station 230 may include a small cell base station, such as a base station of a microcell, a picocell, and/or a femtocell.

Network 240 may include one or more wired and/or wireless networks. For example, network 240 may include a cellular network (e.g., a Long-Term Evolution (LTE) network, a 3G network, a code division multiple access (CDMA) network, etc.), a public land mobile network (PLMN), a wireless local area network (e.g., a WiFi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
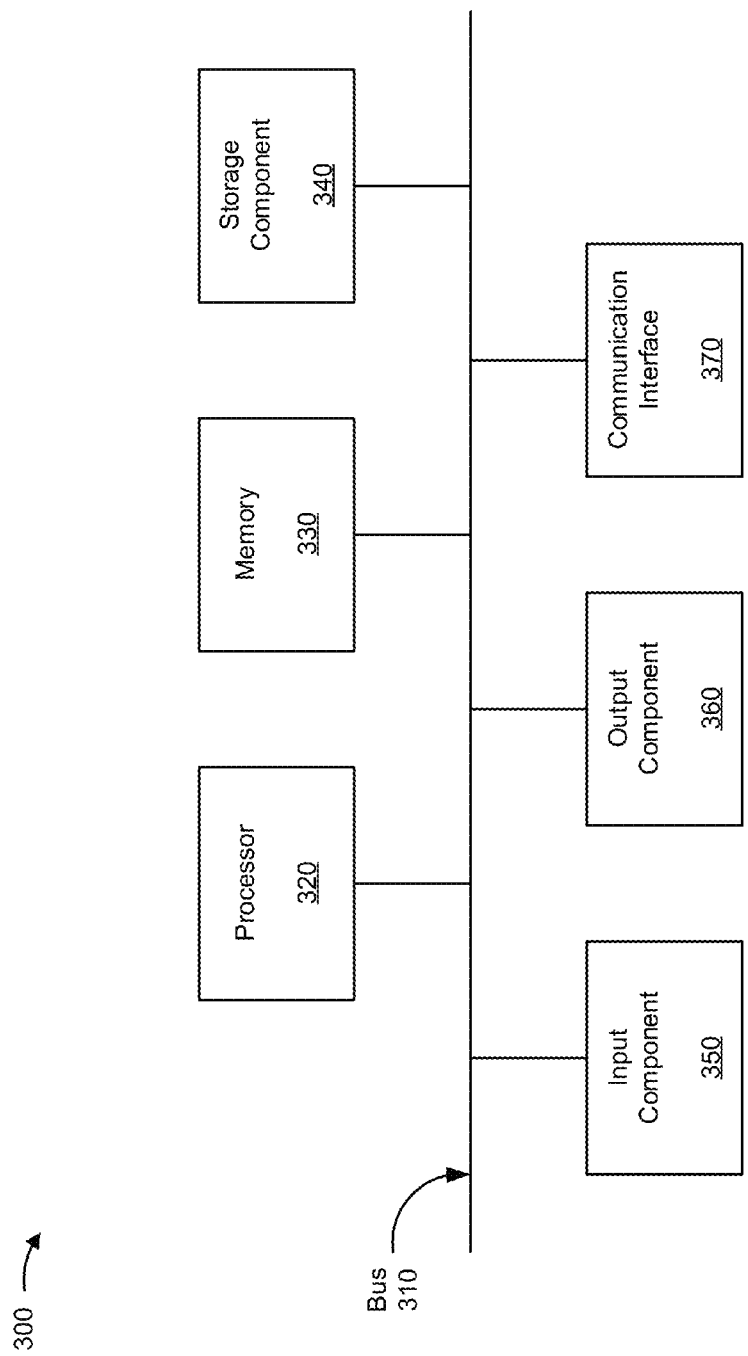
FIG. 3 is a diagram of example components of one or more devices of FIG. 2.

FIG. 3 is a diagram of example components of a device 300. Device 300 may correspond to primary mobile device 210, secondary mobile device 220, and base station 230. In some implementations, primary mobile device 210, secondary mobile device 220, and/or base station 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
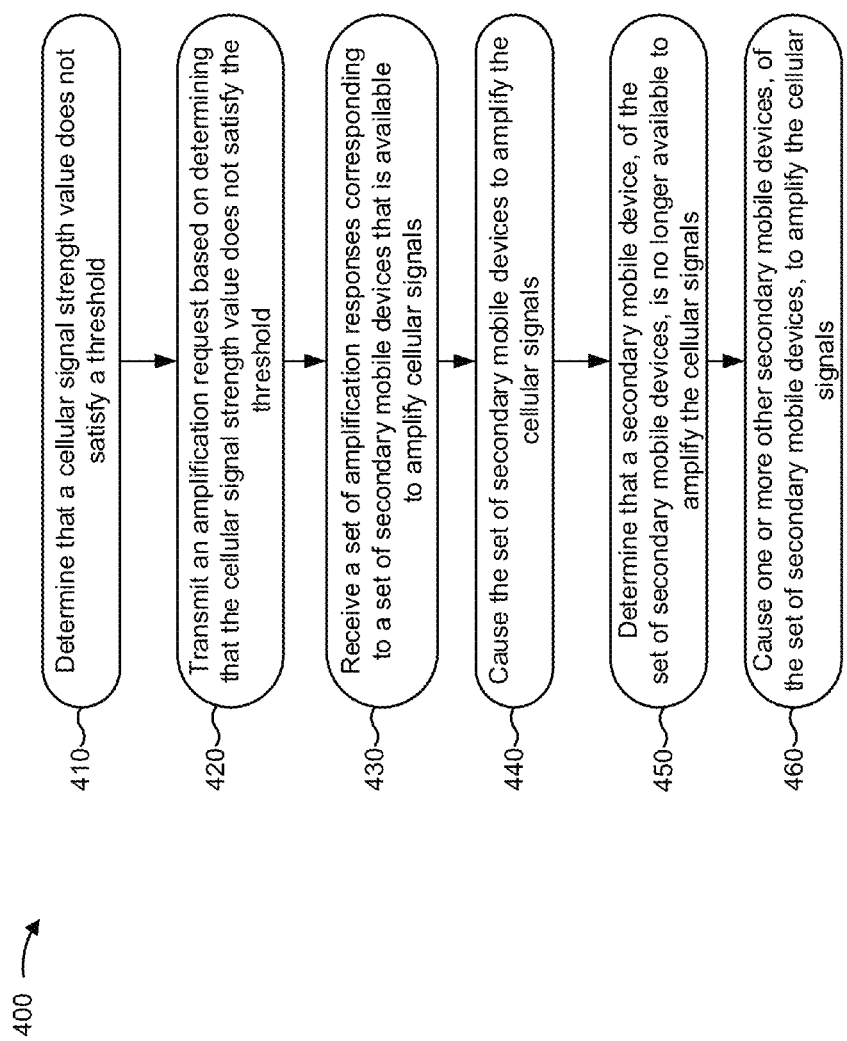
FIG. 4 is a flow chart of an example process for causing a set of secondary mobile devices to amplify cellular signals for a primary mobile device.

FIG. 4 is a flow chart of an example process 400 for causing a set of secondary mobile devices to amplify cellular signals for a primary mobile device. In some implementations, one or more process blocks of FIG. 4 may be performed by primary mobile device 210. In some implementations, one or more process blocks of FIG. 4 may be performed by another device or a group of devices separate from or including primary mobile device 210, such as secondary mobile device 220 and/or base station 230.

As shown in FIG. 4, process 400 may include determining that a cellular signal strength value does not satisfy a threshold (block 410). For example, primary mobile device 210 may obtain a cellular signal strength value associated with primary mobile device 210. The cellular signal strength value may describe a signal strength and/or quality of cellular signals associated with primary mobile device 210 and/or base station 230. Primary mobile device 210 may determine that the cellular signal strength value does not satisfy a threshold. The cellular signal strength value may not satisfy the threshold based on communication between primary mobile device 210 and base station 230 being impeded by distance from base station 230, based on an enclosure in which primary mobile device 210 is located, based on interference from other sources, based on primary mobile device 210 being incapable of transmitting cellular signals with sufficient strength to reach base station 230, or the like.

In some implementations, the cellular signal strength value may include, for example, a received signal code power (RSCP) associated with primary mobile device 210, a received energy per chip (Ec) associated with primary mobile device 210, a noise power density (NO) for primary mobile device 210, a received signal strength indicator (RSSI) associated with primary mobile device 210, a power headroom identifier associated with primary mobile device 210, a signal to interference plus noise ratio (SINR) associated with primary mobile device 210, a channel quality indication (CQI) associated with primary mobile device 210, a sub-band CQI associated with primary mobile device 210, an estimate of a channel rank, a path loss associated with primary mobile device 210, or the like.

In some implementations, primary mobile device 210 may determine a target amplification value based on the cellular signal strength value. When cellular signals associated with primary mobile device 210 are amplified to the target amplification value, the cellular signal strength value associated with primary mobile device 210 may satisfy the threshold. The target amplification value may include, for example, a decibel value, a ratio based on an output power and an input power of cellular signals when the cellular signals are amplified, or the like. As used herein, "amplification" may refer to adding energy to a received cellular signal and outputting the cellular signal at a higher power level. Additionally, or alternatively, "amplification" may refer to receiving a cellular signal, processing the cellular signal, and outputting a cellular signal that is generated based on the received cellular signal and at a higher power level than the received cellular signal.

In some implementations, primary mobile device 210 may determine the target amplification value based on a relationship between amplification values and cellular signal strength values. For example, a first range of cellular signal strength values may be associated with a first target amplification value, a second range of cellular signal strength values may be associated with a second target amplification value, and so on. Primary mobile device 210 may determine the target amplification value based on a range of cellular signal strength values in which a particular cellular signal strength value is included. Additionally, or alternatively, primary mobile device 210 may determine target amplification values based on an equation that relates amplification values and cellular signal strength values, based on a model that receives cellular signal strength values as an input and provides target amplification values as an output, or the like.

As further shown in FIG. 4, process 400 may include transmitting an amplification request based on determining that the cellular signal strength value does not satisfy the threshold (block 420). For example, primary mobile device 210 may transmit an amplification request based on determining that the cellular signal strength does not satisfy the threshold. In some implementations, primary mobile device 210 may transmit the amplification request to one or more secondary mobile devices 220 via base station 230. In some implementations, primary mobile device 210 may transmit the amplification request directly to one or more secondary mobile devices 220 (e.g., without transmitting the amplification request via base station 230). In some implementations, primary mobile device 210 may transmit the amplification request based on a user interaction. For example, primary mobile device 210 may provide a prompt to a user based on determining that the cellular signal strength value does not satisfy the threshold, and the user may cause primary mobile device 210 to transmit the amplification request.

In some implementations, the amplification request may include information relating to primary mobile device 210. For example, the amplification request may include a device identifier associated with primary mobile device 210, may identify a band, a channel, a frequency, or the like, based on which to transmit and/or receive cellular signals associated with primary mobile device 210, may identify a target amplification value requested by primary mobile device 210, or the like.

In some implementations, primary mobile device 210 may transmit the amplification request based on a battery level associated with primary mobile device 210. For example, primary mobile device 210 may determine that a battery level of primary mobile device 210 satisfies a battery level threshold (e.g., a low battery threshold, based on an output power of the battery, based on a remaining charge of the battery, etc.), and may transmit the amplification request based on the battery level satisfying the battery level threshold. Primary mobile device 210 may configure a set of secondary mobile devices 220 to amplify cellular signals associated with primary mobile device 210, as described in more detail below. In this way, the set of secondary mobile devices 220 reduces battery usage of primary mobile device 210 by reducing a power level at which primary mobile device 210 needs to transmit cellular signals to communicate with base station 230.

In some implementations, primary mobile device 210 may transmit the amplification request at a particular power level. For example, assume that primary mobile device 210 transmits cellular signals to base station 230 at a given power level. In some implementations, primary mobile device 210 may transmit the amplification request at a particular power level that is lower than the given power level, which may conserve battery power of primary mobile device 210. In some implementations, primary mobile device 210 may transmit the amplification request at a particular power level that is higher than the given power level, which may increase a quantity of secondary mobile devices 220 that receive the amplification request, thereby increasing the amplification that the quantity of secondary mobile devices 220 can provide.

In some implementations, primary mobile device 210 may determine a power level at which to transmit the amplification request. For example, primary mobile device 210 may transmit the amplification request at a particular power level based on a quantity of secondary mobile devices 220 located nearby, based on a cellular signal strength value associated with primary mobile device 210, based on a battery level of primary mobile device 210, or the like.

In some implementations, primary mobile device 210 may broadcast the amplification request to any secondary mobile device 220 that can receive the amplification request (e.g., that is in range of the amplification request, etc.). Additionally, or alternatively, primary mobile device 210 may transmit the amplification request to one or more particular secondary mobile devices 220 (e.g., based on a unicast transmission to a particular secondary mobile device 220, a multicast transmission to a set of secondary mobile devices 220, etc.). For example, primary mobile device 210 may identify particular secondary mobile devices 220, and may transmit the amplification request to the particular secondary mobile devices 220.

In some implementations, primary mobile device 210 may identify particular secondary mobile devices 220 to receive the amplification request based on transmitting a message to any secondary mobile device 220 in range of the message (e.g., a "ping" message, etc.). Additionally, or alternatively, primary mobile device 210 may obtain information identifying secondary mobile devices 220 that can receive the amplification request from base station 230. For example, base station 230 may store information identifying locations, cellular signal strength values, or the like, for secondary mobile devices 220 that are connected to base station 230. Primary mobile device 210 may obtain information from base station 230 identifying particular secondary mobile devices 220 to which to transmit the amplification request (e.g., based on the particular secondary mobile devices 220 being located close to primary mobile device 210, based on the particular secondary mobile devices 220 being associated with a particular cellular signal strength value, based on the particular secondary mobile devices 220 including an additional antenna and/or processor for amplifying cellular signals, etc.).

As further shown in FIG. 4, process 400 may include receiving a set of amplification responses corresponding to a set of secondary mobile devices that is available to amplify cellular signals (block 430). For example, primary mobile device 210 may receive a set of amplification responses corresponding to a set of secondary mobile devices 220. Secondary mobile device 220, of the set of secondary mobile devices 220, may transmit an amplification response based on secondary mobile device 220 being available to amplify cellular signals associated with primary mobile device 210. In some implementations, secondary mobile device 220 may determine that secondary mobile device 220 is available to amplify a cellular signal based on secondary mobile device 220 being in a standby state (e.g., a sleep state, a state in which secondary mobile device 220 is not associated with an active call, a state in which a display of secondary mobile device 220 is not powered on, a state in which secondary mobile device 220 is not associated with an active data session, etc.). In some implementations, secondary mobile device 220 may determine that secondary mobile device 220 is available to amplify a cellular signal based on secondary mobile device 220 including an additional antenna (e.g., an antenna other than a primary cellular antenna, for receiving and amplifying cellular signals) and/or an additional processor (e.g., a processor other than a main processor, for performing functions related to amplifying cellular signals).

In some implementations, an amplification response may include information relating to secondary mobile device 220. For example, the amplification response may identify secondary mobile device 220, a cellular signal strength value associated with secondary mobile device 220, a battery level associated with secondary mobile device 220, a length of time for which secondary mobile device 220 is available to amplify cellular signals, an amplification value that secondary mobile device 220 is capable of providing (e.g., based on a decibel value, based on a ratio of an output power and an input power of cellular signals when the cellular signals are amplified by secondary mobile device 220, etc.), or the like.

In some implementations, secondary mobile device 220 may transmit an amplification response based on a battery level of secondary mobile device 220, based on a cellular signal strength value associated with secondary mobile device 220, or the like. For example, in a situation where secondary mobile device 220 is in a standby state and is associated with a power headroom identifier that satisfies a particular threshold (e.g., greater than 50% power headroom available, greater than 75% power headroom available, etc.), secondary mobile device 220 may transmit an amplification response to primary mobile device 210. As another example, secondary mobile device 220 may transmit an amplification response in a situation where a battery level of secondary mobile device 220 satisfies a battery level threshold (e.g., at least 50% remaining charge, at least 75% remaining charge, etc.). In this way, secondary mobile device 220 reduces battery usage of a battery associated with secondary mobile device 220 in a situation where the battery is low on charge.

In some implementations, secondary mobile device 220 may process an amplification request and/or generate an amplification response based on software and/or firmware associated with secondary mobile device 220. For example, secondary mobile device 220 may include software and/or firmware to determine that an amplification request is associated with a particular primary mobile device 210, to process a "ping" message and/or an amplification request from primary mobile device 210, to determine that secondary mobile device 220 is available to amplify cellular signals, to determine an amplification level that secondary mobile device 220 is capable of providing, to cause an antenna of secondary mobile device 220 (e.g., a primary cellular antenna and/or an additional antenna) to amplify cellular signals, or the like. In some implementations, the software and/or firmware may execute on a main processor of secondary mobile device 220. Additionally, or alternatively, the software and/or firmware may execute on an additional process that performs functions for amplifying cellular signals.

In some implementations, an amplification response may include information identifying an amplification value that secondary mobile device 220 is capable of providing. For example, in some cases, a user associated with secondary mobile device 220 may specify a threshold amplification value that secondary mobile device 220 is permitted to provide (e.g., to conserve battery power for secondary mobile device 220, to preserve signal quality for secondary mobile device 220, etc.), and the amplification response may identify the threshold amplification value. As another example, secondary mobile device 220 may cease amplification of cellular signals when secondary mobile device 220 enters an active state (e.g., based on receiving and/or placing a call, based on a user interacting with secondary mobile device 220, etc.), and the amplification response may indicate that secondary mobile device 220 will cease amplification of cellular signals when entering the active state.

In some implementations, a first secondary mobile device 220 may transmit an amplification response to primary mobile device 210 via a second secondary mobile device 220. For example, the second secondary mobile device 220 may provide an amplification request, associated with primary mobile device 210, to the first secondary mobile device 220. The first secondary mobile device 220 may determine that the first secondary mobile device 220 can amplify cellular signals associated with primary mobile device 210 and, therefore, may transmit an amplification response to primary mobile device 210 via the second secondary mobile device 220.

As further shown in FIG. 4, process 400 may include causing the set of secondary mobile devices to amplify the cellular signals (block 440). For example, primary mobile device 210 may cause the set of secondary mobile devices 220 to amplify the cellular signals. In some implementations, primary mobile device 210 may transmit instructions to the set of secondary mobile devices 220 identifying amplification values to be provided by one or more secondary mobile devices 220 of the set of secondary mobile devices 220. A particular secondary mobile device 220, of the set of secondary mobile devices 220, may receive a cellular signal (e.g., from primary mobile device 210, from base station 230, etc.), may amplify the cellular signal based on an amplification value identified by an instruction received by the particular secondary mobile device 220 to form an amplified cellular signal, and may transmit the amplified cellular signal. In some implementations, primary mobile device 210 may cause a subset (i.e., fewer than all secondary mobile devices 220 in the set of secondary mobile devices 220) of the set of secondary mobile devices 220 to amplify the cellular signals.

In some implementations, primary mobile device 210 may select all of, or a subset of, the set of secondary mobile devices 220 to amplify cellular signals (e.g., based on cellular signal strength values associated with the set of secondary mobile devices 220, based on battery levels of the set of secondary mobile devices 220, etc.). For example, primary mobile device 210 may cause all of the set of secondary mobile devices 220 to amplify the cellular signals. As another example, primary mobile device 210 may cause each of the set of secondary mobile devices 220 to amplify a different portion of the cellular signals.

As yet another example, primary mobile device 210 may cause a first subset of the set of secondary mobile devices 220 to amplify a first portion of the cellular signals and a second subset of the set of secondary mobile devices 220 to amplify a second portion of the cellular signals. As still another example, primary mobile device 210 may cause a subset of the set of secondary mobile devices 220 to amplify cellular signals, and may not cause other secondary mobile devices 220, of the set of secondary mobile devices 220, to amplify the cellular signals.

As an example, assume that primary mobile device 210 transmits an amplification request, and assume that three secondary mobile devices 220 receive the amplification request. Assume that a first of the three secondary mobile devices 220 provides an amplification response indicating that the first secondary mobile device 220 can provide 10 decibels (dB) of amplification, that a second of the three secondary mobile devices 220 provides an amplification response indicating that the second secondary mobile device 220 can provide 20 dB of amplification, and that a third of the three secondary mobile devices 220 provides an amplification response indicating that the third secondary mobile device 220 can provide 10 dB of amplification.

In that case, primary mobile device 210 may select two or more of the three secondary mobile devices 220 to amplify cellular signals based on the decibel values identified by the amplification responses. For example, in a situation where primary mobile device 210 needs 30 dB of amplification, primary mobile device 210 may select all of the three secondary mobile devices 220 to provide the amplification, or may select a subset of the three secondary mobile devices 220 (e.g., the first and second secondary mobile devices 220, the second and third secondary mobile devices 220, etc.).

In some implementations, primary mobile device 210 may cause each secondary mobile device 220, of the three secondary mobile devices 220, to amplify a cellular signal equally. To continue the above example, primary mobile device 210 may cause the first secondary mobile device 220, the second secondary mobile device 220, and the third secondary mobile device 220 to amplify the cellular signal by 10 dB each, which reduces antenna usage, battery usage, and processor usage of the second secondary mobile device 220, and which mitigates an impact of a failure or an unavailability of a single secondary mobile device 220.

Additionally, or alternatively, primary mobile device 210 may cause two or more of the three secondary mobile device 220 to provide different amplification values. Still continuing the above example, primary mobile device 210 may cause the second secondary mobile device 220 to provide 20 dB of amplification, and may cause the first and third secondary mobile devices 220 to each provide 5 dB of amplification. In this way, primary mobile device 210 reduces antenna usage, battery usage, and processor usage of the first and third secondary mobile devices 220, and reduces an impact of a failure or unavailability of the first and/or third secondary mobile devices 220 to amplify cellular signals.

In some implementations, secondary mobile device 220 may amplify cellular signals en route to primary mobile device 210 from base station 230. For example, a set of secondary mobile devices 220 may receive cellular signals from base station 230 (e.g., may receive the same cellular signal, may receive two or more different cellular signals, etc.), and may amplify the cellular signals. The set of secondary mobile devices 220 may transmit amplified cellular signals to primary mobile device 210. In some implementations, the set of secondary mobile devices 220 may determine that the cellular signals are associated with primary mobile device 210 based on a band associated with the cellular signals, a frequency associated with the cellular signals, a channel associated with the cellular signals, a header associated with the cellular signals, an encoding scheme associated with the cellular signals, or the like.

In some implementations, a particular secondary mobile device 220 may identify a particular cellular signal to amplify, and may amplify the particular cellular signal. For example, the particular secondary mobile device 220 may determine, based on information included in the particular cellular signal (e.g., based on an identifier associated with the particular secondary mobile device 220, based on an instruction to cause the particular secondary mobile device 220 to amplify the particular cellular signal, etc.), that the particular secondary mobile device 220 is to amplify the particular cellular signal.

In a situation where the particular secondary mobile device 220 receives the particular cellular signal from base station 230, base station 230 may transmit the particular cellular signal including the information. For example, primary mobile device 210 may transmit, to base station 230 (e.g., directly to base station 230, via one or more secondary mobile devices 220, etc.) information identifying the particular secondary mobile device 220 and the particular cellular signal. Based on the information identifying the particular secondary mobile device 220 and the particular cellular signal, base station 230 may include information, in the particular cellular signal, that causes the particular secondary mobile device 220 to amplify the particular cellular signal.

In some implementations, a first secondary mobile device 220 may receive cellular signals, and may transmit the cellular signals to a second secondary mobile device 220 (e.g., after amplifying the cellular signal, without amplifying the cellular signal, etc.). The second secondary mobile device 220 may receive the cellular signals, and may transmit the cellular signals to another device (e.g., primary mobile device 210, a third secondary mobile device 220, base station 230, etc.) (e.g., after amplifying the cellular signal, without amplifying the cellular signal, etc.). In some implementations, the second secondary mobile device 220 may amplify the cellular signals. Additionally, or alternatively, the second secondary mobile device 220 may not amplify the cellular signals (e.g., may receive the cellular signals after the first secondary mobile device 220 has amplified the cellular signals, etc.). In this way, multiple secondary mobile devices 220 in series can relay cellular signals to primary mobile device 210, which increases a geographical area in which the multiple secondary mobile devices 220 can transmit cellular signals to primary mobile device 210.

In some implementations, one or more secondary mobile devices 220 may amplify cellular signals relating to two or more primary mobile devices 210. For example, the one or more secondary mobile devices 220 may amplify the same cellular signals for the two or more primary mobile devices 210, may amplify different cellular signals for each of the primary mobile devices 210 (e.g., cellular signals at a first frequency associated with a first primary mobile device 210 and cellular signals at a second frequency associated with a second primary mobile device 210, etc.), or the like.

In some implementations, a first primary mobile device 210 may receive an amplification request from a second primary mobile device 210, and may cause a set of secondary mobile devices 220 to amplify cellular signals for the second primary mobile device 210. For example, assume that the first primary mobile device 210 has previously caused the set of secondary mobile devices 220 to amplify cellular signals associated with the first primary mobile device 210. Assume further that the first primary mobile device 210 receives an amplification request from the second primary mobile device 210.

In that case, the first primary mobile device 210 may cause the set of secondary mobile devices 220 to amplify cellular signals associated with the second primary mobile device 210. For example, the first primary mobile device 210 may cause the set of secondary mobile devices 220 to amplify cellular signals based on an amplification value that the set of secondary mobile devices 220 can provide, based on an amplification value that the set of secondary mobile devices 220 is providing for the first primary mobile device 210, or the like.

In some implementations, secondary mobile device 220 may amplify cellular signals using an additional antenna other than a primary cellular antenna of secondary mobile device 220. For example, secondary mobile device 220 may use the additional antenna to receive amplification requests and/or provide amplification responses based on the amplification requests. For example, the additional antenna may be associated with a main processor of secondary mobile device 220, or may be associated with a different processor than the main processor. The processor associated with the additional antenna (e.g., the main processor, the different processor, etc.) may receive the amplification request and may cause the additional antenna to transmit an amplification response. In some implementations, the processor associated with the additional antenna may cause the additional antenna to amplify the cellular signals.

In a situation where the processor associated with the additional antenna is included in the main processor, secondary mobile device 220 may be less expensive to manufacture and/or simpler to implement than in a situation where the processor associated with the additional antenna is a different processor than the main processor. In a situation where the processor associated with the additional antenna is a different processor than the main processor, secondary mobile device 220 improves security of the amplification process and reduces an impact of the amplification process on the main processor.

As further shown in FIG. 4, process 400 may include determining that a secondary mobile device, of the set of secondary mobile devices, is no longer available to amplify the cellular signals (block 450). For example, primary mobile device 210 may determine that a particular secondary mobile device 220, of the set of secondary mobile devices 220, is no longer available to amplify the cellular signal. In some implementations, primary mobile device 210 may determine that the particular secondary mobile device 220 is no longer available to amplify cellular signals based on an elapsed length of time since starting amplification of cellular signals, based on receiving a message from the particular secondary mobile device 220, based on determining that the particular secondary mobile device 220 is no longer within a transmit range of primary mobile device 210, based on a cellular signal strength value associated with amplified signals received from the particular secondary mobile device 220, or the like.

In some cases, a particular secondary mobile device 220 may transmit a message to primary mobile device 210 indicating that the particular secondary mobile device 220 is no longer available to amplify cellular signals. For example, the particular secondary mobile device 220 may transmit the message based on the particular secondary mobile device 220 entering an active state, based on the particular secondary mobile device 220 placing or receiving a call, based on determining that a battery level of the particular secondary mobile device 220 satisfies a threshold, based on determining that a particular length of time has elapsed since the particular secondary mobile device 220 began amplifying cellular signals, or the like.

In some implementations, primary mobile device 210 may determine, based on stored information, that a particular secondary mobile device 220 can no longer amplify cellular signals. For example, an amplification response may identify a condition for the particular secondary mobile device 220 with regard to amplifying cellular signals (e.g., a particular length of time, a particular quantity of data, a particular amplification value, a minimum cellular signal strength value associated with the particular secondary mobile device 220, etc.). Primary mobile device 210 may determine that the condition has been satisfied (e.g., that the particular length of time has elapsed, that the particular quantity of data has been transmitted via the particular secondary mobile device 220, that the particular secondary mobile device 220 would need to provide an amplification value greater than the particular amplification value, that a cellular signal strength value associated with the particular secondary mobile device 220 does not satisfy the minimum cellular signal strength value, etc.). Based on the condition being satisfied, primary mobile device 210 may determine that the particular secondary mobile device 220 is no longer available to amplify the cellular signals.

As further shown in FIG. 4, process 400 may include causing one or more other secondary mobile devices, of the set of secondary mobile devices, to amplify the cellular signals (block 460). For example, based on determining that the secondary mobile device 220, of the set of secondary mobile devices 220, is no longer available to amplify the cellular signals, primary mobile device 210 may select one or more other secondary mobile devices 220, of the set of secondary mobile devices 220, to amplify the cellular signals. Primary mobile device 210 may cause the one or more other secondary mobile devices 220 to amplify the cellular signals.

In some implementations, primary mobile device 210 may transmit an amplification request based on determining that a particular secondary mobile device 220 is no longer available to amplify the cellular signals. Primary mobile device 210 may select the one or more other secondary mobile devices 220 based on receiving amplification responses by the one or more other secondary mobile devices 220. By transmitting an amplification request to identify the one or more other secondary mobile devices 220, primary mobile device 210 reduces local storage requirements and/or antenna usage of primary mobile device 210 and/or secondary mobile device 220.

Additionally, or alternatively, primary mobile device 210 may select the one or more secondary mobile devices 220 using information received based on a previous amplification request associated with the set of secondary mobile devices 220. For example, primary mobile device 210 may store information identifying amplification values that the set of secondary mobile devices 220 is capable of providing, and may use the stored information to identify the one or more other secondary mobile devices 220.

In some implementations, primary mobile device 210 may cause a particular secondary mobile device 220, of the set of secondary mobile devices 220, to increase an amplification level associated with the cellular signals. For example, based on one or more other secondary mobile devices 220 becoming unavailable to amplify cellular signals, primary mobile device 210 may cause the particular secondary mobile device 220 to increase a provided amplification value. In this way, primary mobile device 210 can mitigate the impact of the one or more other secondary mobile devices 220 becoming unavailable to amplify the cellular signals.

Additionally, or alternatively, primary mobile device 210 may cause a particular secondary mobile device 220 to decrease an amplification value. For example, primary mobile device 210 may identify other secondary mobile devices 220 that are available to amplify the cellular signals, may identify other secondary mobile devices 220 that are associated with a higher cellular signal strength value than the particular secondary mobile device 220, or the like. Accordingly, primary mobile device 210 may cause the particular secondary mobile device 220 to decrease an amplification value, and may cause the other secondary mobile devices 220 to increase respective amplification values. In this way, primary mobile device 210 improves performance of the amplification process and reduces battery usage, processor usage, and antenna usage associated with the particular secondary mobile device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a primary mobile device causes a set of secondary mobile devices to amplify cellular signals associated with the primary mobile device. The primary mobile device may cause the set of secondary mobile devices to amplify the cellular signals based on availability of the set of secondary mobile devices to amplify the cellular signals and/or based on respective amplification values that the set of secondary mobile devices can provide, which reduces impact of a failure or unavailability of a single secondary mobile device, and which conserves processor resources, battery power, and antenna power of the set of secondary mobile devices. In some cases, the set of secondary mobile devices may amplify the cellular signals using antennas other than primary cellular antennas of the set of secondary mobile devices, which improves security of the amplification process and reduces usage of the primary cellular antenna, which conserves battery power and improves performance of the primary cellular antenna.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
  determine that a cellular signal strength value does not satisfy a threshold,
    the cellular signal strength value relating to a strength or a quality of cellular signals transmitted by or received by the device;
  transmit an amplification request based on determining that the cellular signal strength value does not satisfy the threshold;
  receive, based on the amplification request, a plurality of amplification responses corresponding to a respective plurality of mobile devices,
    a mobile device, of the plurality of mobile devices, transmitting an amplification response, of the plurality of amplification responses, based on the mobile device being available to amplify the cellular signals;
  select at least two mobile devices, of the plurality of mobile devices, to amplify the cellular signals transmitted by or received by the device,
    the at least two mobile devices being selected based on information included in respective amplification responses, of the plurality of amplification responses, corresponding to the at least two mobile devices,
      the information included in the respective amplification responses including information identifying a respective amplification value that the at least two mobile devices are capable of providing,
      the respective amplification value identifying a ratio based on an output power and an input power of cellular signals to be amplified by each of the at least two mobile devices; and
  cause the at least two mobile devices to amplify the cellular signals transmitted by or received by the device based on the respective amplification value.

2. The device of claim 1, where the one or more processors are further to:
determine that a particular mobile device, of the at least two mobile devices, is not available to amplify the cellular signals; and
cause one or more other mobile devices, of the plurality of mobile devices, to amplify the cellular signals based on determining that the particular mobile device is not available to amplify the cellular signals.

3. The device of claim 2, where the one or more processors, when determining that the particular mobile device is not available to amplify the cellular signals, are to:
determine that the particular mobile device is not available based on at least one of receiving a message from the particular mobile device indicating that the particular mobile device is not available or determining that a particular length of time has elapsed after causing the particular mobile device to amplify the cellular signals.

4. The device of claim 1, where the cellular signal strength value includes one or more of:
information associated with a received signal code power, information associated with a received energy per chip, information associated with a noise power density,
a received signal strength indicator,
a power headroom identifier,
information associated with a signal to interference plus noise ratio,
a channel quality indication,
a sub-band channel quality indication,
information associated with an estimate of a channel rank, or
information associated with a path loss.

5. The device of claim 1,
where the one or more processors, when causing the at least two mobile devices to amplify the cellular signals, are to:
cause a first mobile device, of the at least two mobile devices, to amplify the cellular signals more than a second mobile device of the at least two mobile devices,
the first mobile device being caused to amplify the cellular signals more than the second mobile device based on respective amplification values associated with the first mobile device and the second mobile device.

6. The device of claim 1, where the device is a first device and the amplification request is a first amplification request; and
where the one or more processors are to:
receive a second amplification request from a second device; and
cause one or more mobile devices, of the plurality of mobile devices, to amplify cellular signals associated with the second device.

7. The device of claim 1, where a particular mobile device, of the at least two mobile devices, includes a primary cellular antenna and an additional antenna; and
where the one or more processors, when causing the at least two mobile devices to amplify the cellular signals, are to:
cause the particular mobile device to amplify the cellular signals using the additional antenna and not using the primary cellular antenna.

8. A non-transitory computer-readable medium storing instructions, the instructions comprising:
one or more instructions that, when executed by one or more processors of a device, cause the one or more processors to:
determine that a cellular signal strength value does not satisfy a threshold,
the cellular signal strength value relating to a strength or a quality of cellular signals transmitted by or received by the device;
transmit an amplification request based on determining that the cellular signal strength value does not satisfy the threshold;
receive, based on the amplification request, a plurality of amplification responses corresponding to a respective plurality of mobile devices,
a mobile device, of the plurality of mobile devices, transmitting an amplification response, of the plurality of amplification responses, based on the mobile device being available to amplify the cellular signals;
select at least two mobile devices, of the plurality of mobile devices, to amplify the cellular signals transmitted by or received by the device,
the at least two mobile devices being selected based on information included in respective amplification responses, of the plurality of amplification responses, corresponding to the at least two mobile devices,
the information included in the respective amplification responses including information identifying a respective amplification value that the at least two mobile devices are capable of providing,
the respective amplification value identifying a ratio based on an output power and an input power of cellular signals to be amplified by each of the at least two mobile devices; and
cause the at least two mobile devices to amplify the cellular signals transmitted by or received by the device based on the respective amplification value.

9. The non-transitory computer-readable medium of claim 8, where the one or more instructions, that cause the one or more processors to select the at least two mobile devices, cause the one or more processors to:
select each mobile device, of the plurality of mobile devices, to amplify the cellular signals; and
where the one or more instructions, that cause the one or more processors to cause the at least two mobile devices to amplify the cellular signals, cause the one or more processors to:
cause each mobile device to amplify the cellular signals.

10. The non-transitory computer-readable medium of claim 8, where the one or more instructions, that cause the one or more processors to receive the plurality of amplification responses, cause the one or more processors to:
receive an amplification response, of the plurality of amplification responses, based on a corresponding mobile device being available to amplify cellular signals,
the corresponding mobile device being available to amplify cellular signals based on at least one of:
the corresponding mobile device being in a standby state,
the corresponding mobile device being associated with a particular battery level that satisfies a battery level threshold,
the corresponding mobile device having a processor other than a main processor available to process cellular signals,
the corresponding mobile device having an antenna other than a primary cellular antenna available to amplify cellular signals, or
a user of the corresponding mobile device causing the corresponding mobile device to be available to amplify cellular signals.

11. The non-transitory computer-readable medium of claim 8, where a first amplification value associated with a first mobile device, of the at least two mobile devices, is different than a second amplification value associated with a second mobile device of the at least two mobile devices; and
where the one or more instructions, that cause the one or more processors to cause the at least two mobile devices to amplify the cellular signals, cause the one or more processors to:
cause the first mobile device to amplify the cellular signals based on the first amplification value; and
cause the second mobile device to amplify the cellular signals based on the second amplification value,
the second mobile device amplifying the cellular signals to a different power level than the first mobile device.

12. The non-transitory computer-readable medium of claim 8, where the one or more instructions, when executed by the one or more processors, further cause the one or more processors to:

receive a message from a particular mobile device, of the at least two mobile devices, indicating that the particular mobile device is not available to amplify the cellular signals,
the particular mobile device transmitting the message based on the particular mobile device switching from a standby state to an active state; and cause one or more other mobile devices, of the plurality of mobile devices, to amplify the cellular signals based on the particular mobile device not being available to amplify the cellular signals.

13. The non-transitory computer-readable medium of claim 8, where a particular mobile device, of the at least two mobile devices, includes a primary cellular antenna and an additional antenna; and where the one or more instructions, that cause the one or more processors to cause the at least two mobile devices to amplify the cellular signals, cause the one or more processors to:
cause the particular mobile device to amplify the cellular signals using the additional antenna.

14. The non-transitory computer-readable medium of claim 8, where the amplification request identifies a target amplification value,
the target amplification value indicating an amount by which the cellular signal strength value is to be increased to satisfy the threshold.

15. A method, comprising:

transmitting, by a device, an amplification request relating to cellular signals transmitted by or received by the device;

receiving, by the device and based on transmitting the amplification request, a plurality of amplification responses corresponding to a respective plurality of mobile devices,
a mobile device, of the plurality of mobile devices, transmitting an amplification response, of the plurality of amplification responses, based on the mobile device being available to amplify the cellular signals;

selecting, by the device, at least two mobile devices, of the plurality of mobile devices, to amplify the cellular signals transmitted or received by the device,
the at least two mobile devices being selected based on information included in respective amplification responses, of the plurality of amplification responses, corresponding to the at least two mobile devices,
the information included in the respective amplification responses including information identifying a respective amplification value that the at least two mobile devices are capable of providing,
the respective amplification value identifying a ratio based on an output power and an input power of cellular signals to be amplified by each of the at least two mobile devices; and causing, by the device, the at least two mobile devices to amplify the cellular signals transmitted by or received by the device based on the respective amplification value.

16. The method of claim 15, where transmitting the amplification request comprises:
transmitting the amplification request based on at least one of:
determining that a battery level of the device does not satisfy a battery level threshold, or
receiving a user interaction to cause the device to transmit the amplification request.

17. The method of claim 15, where a particular mobile device, of the at least two mobile devices, includes a primary cellular antenna and an additional antenna; and
where causing the at least two mobile devices to amplify the cellular signals comprises:
transmitting one or more instructions to the particular mobile device to cause the particular mobile device to amplify the cellular signals using the additional antenna and without using the primary cellular antenna.

18. The method of claim 17, where receiving the plurality of amplification responses comprises:
receiving, from the particular mobile device, a particular amplification response of the plurality of amplification responses,
the particular amplification response being transmitted using the additional antenna.

19. The method of claim 15, further comprising:
receiving a message from a particular mobile device, of the at least two mobile devices, indicating that the particular mobile device is not available to amplify the cellular signals,
the particular mobile device transmitting the message based on at least one of:
a battery level of the particular mobile device not satisfying a battery level threshold,
an elapsed length of time since a time at which the device caused amplification of the cellular signals by the particular mobile device to begin,
the particular mobile device switching from a standby state to an active state, or
a user interaction from a user of the particular mobile device;
selecting one or more other mobile devices, of the plurality of mobile devices, to amplify the cellular signals; and
causing the one or more other mobile devices to amplify the cellular signals rather than the particular mobile device.

20. The method of claim 19, where the information included in the plurality of amplification responses identifies respective amplification values that the plurality of mobile devices are capable of providing; and
where selecting the one or more other mobile devices comprises:
selecting, based on amplification values associated with the particular mobile device and the one or more other mobile devices, the one or more other mobile devices to amplify the cellular signals.

* * * * *